United States Patent [19]

Kemppainen

[11] Patent Number: 5,428,602
[45] Date of Patent: Jun. 27, 1995

[54] FREQUENCY-HOPPING ARRANGEMENT FOR A RADIO COMMUNICATION SYSTEM

[75] Inventor: Jari Kemppainen, Oulu, Finland

[73] Assignee: Telenokia Oy, Espoo, Finland

[21] Appl. No.: 910,126

[22] PCT Filed: Nov. 14, 1991

[86] PCT No.: PCT/FI91/00339
§ 371 Date: Sep. 15, 1992
§ 102(e) Date: Sep. 15, 1992

[87] PCT Pub. No.: WO92/09154
PCT Pub. Date: May 29, 1992

[30] Foreign Application Priority Data

Nov. 15, 1990 [FI] Finland .................. 905667

[51] Int. Cl.⁶ .................................................. H04B 1/69
[52] U.S. Cl. ........................................ 370/18; 375/202
[58] Field of Search ........................ 370/18, 19, 57, 84, 370/95.1, 69.1; 375/96, 38, 1, 80, 60, 66; 455/33.1, 33.2, 33.3, 33.4

[56] References Cited

U.S. PATENT DOCUMENTS

| | | | |
|---|---|---|---|
| 4,383,323 | 5/1983 | Timor | 370/93 |
| 4,447,907 | 5/1984 | Bjornholt et al. | 375/1 |
| 4,457,003 | 6/1984 | Reed | 375/1 |
| 4,553,101 | 11/1985 | Mathis | 375/80 |
| 4,616,364 | 10/1986 | Lee | 375/1 |
| 4,850,036 | 6/1989 | Smith | 375/1 |
| 4,930,140 | 5/1990 | Cripps et al. | 375/1 |
| 5,038,341 | 8/1991 | Barman et al. | 370/18 |
| 5,177,767 | 1/1993 | Kato | 375/1 |
| 5,307,341 | 4/1994 | Yates et al. | 370/18 |

FOREIGN PATENT DOCUMENTS

| | | | |
|---|---|---|---|
| 0120718 | 10/1984 | European Pat. Off. | H04Q 7/04 |
| 1120718 | 10/1984 | European Pat. Off. | |
| 0297549 | 1/1989 | European Pat. Off. | H04Q 7/04 |
| 2297549 | 1/1989 | European Pat. Off. | |
| 0361299 | 4/1990 | European Pat. Off. | H04B 7/26 |
| 2361299 | 4/1990 | European Pat. Off. | |

Primary Examiner—Douglas W. Olms
Assistant Examiner—Chau T. Nguyen
Attorney, Agent, or Firm—Cushman Darby & Cushman

[57] ABSTRACT

The invention relates to the realization of frequency hopping in radio transmitter, receiver or transceiver systems. In the system according to the invention, a separate fixed-frequency radio transmitter or radio receiver is provided for each frequency utilized in the frequency hopping. The frequency hopping is realized by switching received inbound signals or outbound signals as baseband signals to the different fixed-frequency transmitters or receivers in accordance with a frequency-hopping sequence.

17 Claims, 1 Drawing Sheet

FREQUENCY-HOPPING ARRANGEMENT FOR A RADIO COMMUNICATION SYSTEM

BACKGROUND OF THE INVENTION

1. Field of the Invention

The invention relates to the realization of frequency-hopping in radio transmitter systems, radio receiver systems and radio transceiver systems.

2. Description of the Related Art

The specifications of the European mobile radio system GSM (General Systeme Mobile) define a so-called frequency-hopping function in which the transmitting frequency during signal transmission and correspondingly the receiving frequency at the receiving end is varied continuously by using a suitable number of frequencies, e.g. four predetermined frequencies. Frequency-hopping has two advantageous effects, viz. frequency diversity and interference diversity.

Frequency diversity improves the quality of a radio link mainly in cases where the radio transmitter and the radio receiver move slowly with respect to each other. When the frequency of a radio link in a digital mobile radio system is varied sufficiently from one channel time slot to another, fading situations imposed on different channel time slots do not correlate with each other consequently the time slot interleaving utilized in the system also helps to improve the quality of transmission at the reception when fading occurs.

The interference diversity effect is based on the fact that the frequency-hopping sequences of base stations using the same or adjacent frequencies are different or at least at different phases with respect to each other, whereby the frequencies interfering with each other also vary from one time slot to another, and the effect of severe sources of interference is divided between several radio links, and so the effect of the interference on an individual link is reduced.

SUMMARY OF THE INVENTION

The object of the present invention is to provide a radio system realizing such a frequency-hopping function.

This is achieved by a radio transmitter system according to the invention, which system comprises means for transmitting at least one signal in least at two transmitting frequencies, the frequencies varying in accordance with a predetermined frequency-hopping sequence. The system comprises a fixed-frequency radio transmitter for each transmitting frequency, and means for switching the at least one signal as a baseband signal from baseband signal processing stages to fixed-frequency radio transmitters in accordance with the frequency-hopping sequence.

The invention is also concerned with a radio receiver system which comprises a radio receiver for receiving at least one signal in at least two receiving frequencies, which frequencies vary in accordance with a predetermined frequency-hopping sequence. The system comprises a fixed-frequency radio receiver for each receiving frequency, and means for switching the at least one received signal as a baseband signal from the fixed-frequency radio receivers to baseband signal processing stages in accordance with the frequency-hopping sequence.

The invention is further concerned with a radio transceiver system which includes a radio transceiver for transmitting at least one outbound signal in at least two transmitting frequencies, which frequencies vary in accordance with a predetermined frequency-hopping sequence. The radio transceiver also receives at least one inbound signal in at least two receiving frequencies, which frequencies also vary in accordance with the frequency-hopping sequence. The system comprises a fixed-frequency radio transceiver for each pair of transmitting and receiving frequencies, and means for switching the at least one outbound signal as a baseband signal from baseband signal processing stages to the fixed-frequency transceivers and for switching the at least one received inbound signal as a baseband signal from the fixed-frequency transceivers to the baseband signal processing stages in accordance with the frequency-hopping sequence.

The basic idea of the invention is that a separate dedicated fixed-frequency transmitter or receiver is provided for each transmitting or receiving frequency, and the frequency hopping is carried out by switching baseband signals. For instance, the frequency of an outbound signal is caused to hop in accordance with a predetermined hopping algorithm by switching a baseband signal to the different transmitters in sequence. Signals from the fixed-frequency transmitters are combined to a transmitting antenna by a combiner circuit.

The invention offers a solution to a serious problem associated with the realization of frequency hopping in such as a GSM system. According to a frequency-hopping algorithm the base station of the system has to change the frequency of a radio link twice within each signal frame. Because the base station transmits the TDMA frame in each time slot, it is necessary that the transmitting frequency can be changed during a guard interval, about 30 µs, between time slots. The frequency synthesizers of the transmitters and the combiner circuit combining the transmitting signals to a common antenna must also have enough time to adapt in a timed relationship with the frequency-hopping algorithm if variable-frequency transmitters are to be used. In practice, however, the realization of variable-frequency transmitting filters, particularly by ones that are sufficiently rapid and economical is very difficult. The realization of the combiner circuit without transmitting filters or by way of broadband transmitting filters results in complicated constructions and high signal attenuations. When using fixed-frequency radio transmitters according to the present invention, the transmitting filters can be fixed, thus avoiding the above-mentioned problem. Furthermore, the construction of the fixed-frequency transmitter (frequency synthesizer) is simpler and more advantageous than that of the variable-frequency transmitter. The same is true for the receiver.

BRIEF DESCRIPTION OF THE DRAWINGS

The invention will now be described in greater detail by reference to the attached drawing, in which.

DETAILED DESCRIPTION OF THE PREFERRED EMBODIMENTS

Frequency-hopping according to the present invention can be applied in any radio system comprising several radio transmitters, radio receivers or radio transceivers. It is, however, especially suitable for use in cellular digital mobile radio systems, such as the GSM mobile radio system, for realizing frequency hopping in radio communication between base stations and mobile radio stations (e.g. mobile telephones).

Figure 1:
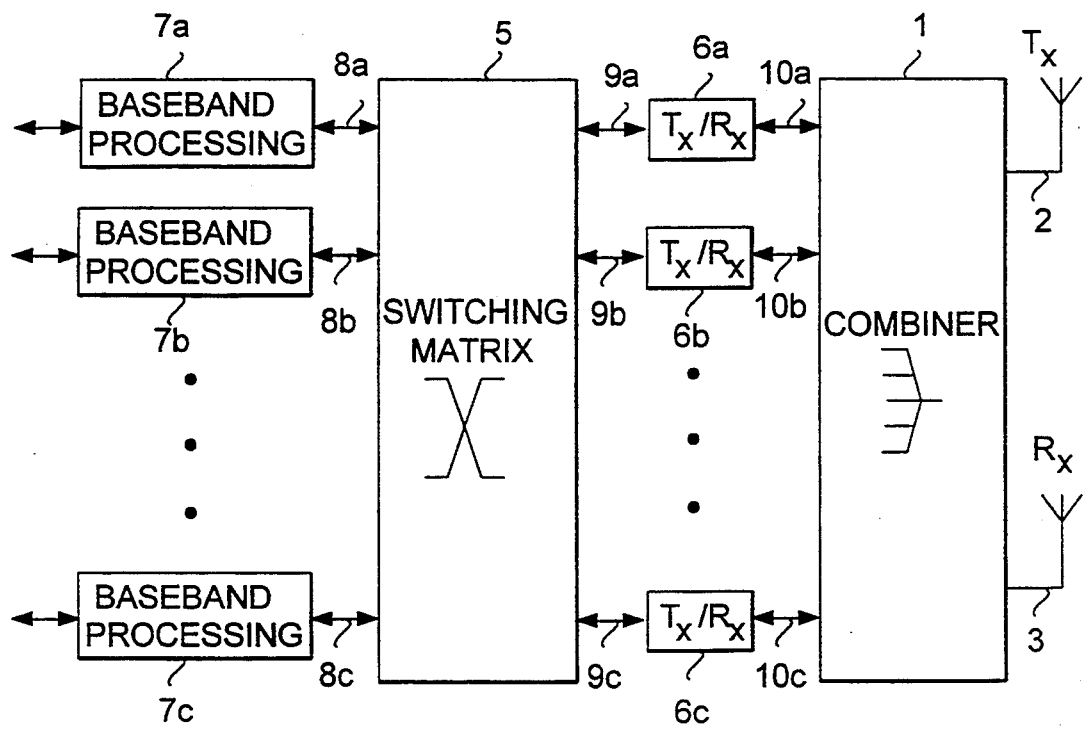
FIG. 1 shows a block diagram of a transceiver system according to the invention.

FIG. 1 shows a block diagram of a transceiver system according to the invention. The system comprises at least two, preferably four, transceiver units $6a$, $6b$ and $6c$. In a GSM system, each transceiver is full-duplex, and the duplex spacing between its receiving and transmitting RF frequencies is 45 MHz. The frequency range utilized by the system is preferably from 800 to 1,000 MHz. The transceivers $6a$ to $6c$ have mutually different fixed transmitting and receiving frequencies. Outputs $10a$ to $10c$ in the transceivers $6a$ to $6c$ are connected to a radio-frequency combiner circuit 1, which combines the transmitters of the transceivers $6a$ to $6c$ to a common transmitting antenna 2 and the receivers to a common receiving antenna 3.

Alternatively, there may be provided two receiving antennas if diversity reception is used. The radio-frequency combiner circuit 1 contains a bandpass-type transmitting filter for the transmitter of each transceiver unit 6, the filter being tuned automatically or manually to the transmitting frequency of the particular transmitter. Similarly, the combiner circuit 1 contains a receiving filter for the receiver of each transceiver unit 6, which filter separates from the antenna signal a signal in the band of receiving frequencies and then amplifies it and divides it to all the receivers.

The system of FIG. 1 further comprises several baseband signal processing units $7a$, $7b$ and $7c$, which generate baseband modulating signals for the transceiver units $6a$ to $6c$ and which process the signals received and converted to the baseband frequency by the transceivers. A cross-point type switching matrix 5 is provided between the transceiver units $6a$ to $6c$ and the baseband signal processing units $7a$ to $7c$. This matrix switches the baseband transmitting signals generated by the baseband signal processing units 7 to the different transceivers $6a$ to $6c$ in accordance with a predetermined frequency-hopping sequence in such a way that the transmitting frequency of a signal generated by a certain baseband signal processing unit 7 hops from one transmitting frequency to another. Correspondingly, the switching matrix 5 switches the signals received and converted to the baseband frequency by the transceivers to the baseband signal processing units $7a$ to $7c$ in accordance with said predetermined frequency-hopping sequence.

Figure 2:
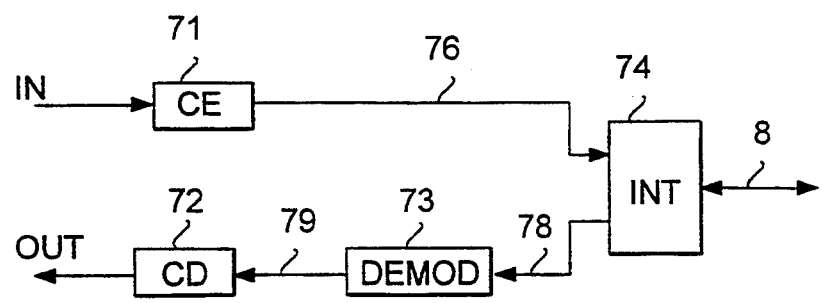
FIG. 2 shows a block diagram of the principal features of the baseband units 7a to 7c shown in FIG. 1.

In the preferred embodiment of the invention, the signal to be transmitted is a serial time-division multiplexed digital signal comprising several, preferably eight, channel time slots. FIG. 2 shows the principal functional blocks of the signal processing units $7a$ to $7c$ of FIG. 1 for the digital signal described above. The baseband processing of the signals takes place entirely in the units $7a$ to $7c$. Generally speaking, data to be transmitted is coded and placed in a frame structure of the signal in the baseband signal processing units $7a$ to $7c$. At the reception, the data is demodulated, the frame structure is disassembled, and decoding is carried out.

More precisely, data (e.g. speech) from other parts of the radio system, such as the base station controller in the GSM system, is processed by a channel coding unit 71 before transmission.

The channel coding unit 71 may perform e.g. the following functions: adaptation of transmission rate, channel coding, interleaving, encryption, assembly of TDMA frame and adjustment of transmitter power control. Within each time slot, the unit 71 transmits a burst containing the data to be transmitted in this particular time slot to an interface unit 74.

The interface 74 converts the parallel data received from the unit 71 into serial form and transmits it in serial form through the switching matrix 5 to the particular transceiver $6a$ to $6b$, the matrix 5 switching the serial base band signal in a corresponding time slot to one of the transceivers in accordance with the frequency-hopping algorithm. Similarly, the interface 74 receives a serial signal from a bus 8 within each receiving time slot, the serial signal containing baseband samples derived from the signal received by a transceiver $6a$ to $6c$ selected by the switching matrix 5 in accordance with the frequency-hopping algorithm.

The interface 74 applies these samples in parallel form to a demodulator 73, which processes the samples. The demodulator 73 contains e.g. the following functions: sample buffering, decryption, GMSK demodulation.

The demodulator 73 applies the demodulated data to a channel decoding unit 72, which performs e.g. the following functions: combining signals from different antennas when antenna diversity is used (two receiving antennas), disassembling the frame structure, breaking up interleaving, convolution decoding, block decoding, checking CRC and error correction, adaptation of transmission rate.

The channel decoding unit 72 transmits the decoded data further to the other units, and, for instance, to the base station controller of the GSM system when the transceiver system is located at the base station.

In the preferred embodiment of the present invention, a modulator corresponding to the demodulator 73 is provided in each transceiver $6a$ to $6c$, in which the data to be transmitted is modulated and converted up to an appropriate radio frequency. Similarly, the data received at the reception is converted by the transceiver down to a baseband frequency and preprocessed for demodulation. Demodulation does not take place until in the units $7a$ to $7c$. In addition, each transceiver $6a$ to $6b$ comprises a unit corresponding to the serial interface unit 74 for receiving the serial signal through the switching matrix 5 from the baseband unit $7a$ to $7c$ coupled to it at each particular moment and, correspondingly, for transmitting a serial signal to the same baseband unit.

Figure 3:
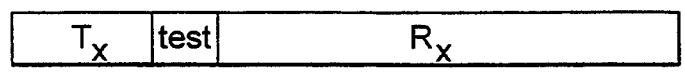
FIG. 3 illustrates the multiplexing of time-multiplexed serial buses 8a and 9a shown in FIG. 1, into transmitting and receiving directions.

As already mentioned above, each baseband signal processing unit $7a$ to $7c$ has a corresponding bidirectional serial bus $8a$ to $8c$, which connects it to a respective port in the switching matrix. Similarly, each transceiver $6a$ to $6c$ is connected by a separate bidirectional serial bus $9a$ to $9c$ to a respective port in the switching matrix 5. Thus a bidirectional time-division digital connection is established between each signal processing unit 7 and the particular transceiver coupled to it in accordance with the frequency-hopping algorithm through the switching matrix 5. Preferably, the baseband signal processing units $7a$ to $7c$ are coupled to a new transceiver after each transmission or reception of a channel time slot during the guard intervals between the channel time slots. Bidirectional means that the same bus is used at different times for both transmission-direction and reception-direction time slots. A time slot complying with the GSM specification may be divided into several shorter time windows for the management of this serial bus, the windows being allocated to transmission (Tx), reception (Rx) and testing (test), as shown in FIG. 3. The illustrated time division of this serial connection is possible due to the fact that the transmitting and receiving moments of the GSM system are not simultaneous. Such serial bidirectional transmission between the units 7a to 7c and 6a to 6c is simpler and more advantageous as compared with a parallel bus, in addition to which it reduces the need for cable laying as the same bus is utilized in both transmission and reception direction and simplifies the realization of the switching matrix 5.

The attached drawings and the description related to them are only intended to illustrate the present invention. In their details, the systems according to the invention may vary within the scope of the accompanying claims.

I claim:

1. A radio transmitter system comprising:
   baseband signal processing means having at least one output for outputting at least one baseband signal;
   at least two radio transmitters, each of said radio transmitters having an individual fixed transmitting frequency and a baseband input, for modulating a baseband input signal to said fixed transmitting frequency; and
   switching means having at least one input connected to said baseband signal processing means, and at least two outputs connected to said baseband inputs of said at least two radio transmitters, respectively, for sequentially switching said at least one baseband signal between said at least two radio transmitters in accordance with a predetermined frequency-hopping sequence.

2. A radio receiver system comprising:
   baseband signal processing means having at least one input for inputting at least one baseband signal;
   at least two radio receivers, each said radio receiver having an individual fixed receiving frequency and a baseband output, for demodulating a signal from said fixed receiving frequency to baseband; and
   switching means having at least one output connected to said at least one input of said baseband signal processing means, and at least two inputs connected to said baseband outputs of said at least two receivers, respectively, for sequentially switching said at least one baseband signal from said radio receivers to said baseband signal processing means in accordance with a predetermined frequency-hopping sequence.

3. A radio transceiver system comprising:
   baseband signal processing means having at least one input for inputting at least one pair of inbound baseband signal and at least one output for outputting at least one outbound baseband signal;
   at least two radio transceivers, each radio transceiver having a pair of individual fixed transmitting and receiving frequencies each radio transceiver having a baseband input and a baseband output, for modulating a baseband signal at said input to said fixed transmitting frequency and for demodulating a signal from said fixed receiving frequency to baseband; and switching means for sequentially switching said at least one outbound baseband signal from said baseband signal processing means to said radio transceivers and for sequentially switching said at least one inbound baseband signal from said radio transceivers to the baseband signal processing means in accordance with a predetermined frequency-hopping sequence.

4. A system according to claim 1, 2 or 3, wherein said switching means is a switching matrix.

5. A system according to claim 1 or 2, wherein said at least one baseband signal is a serial digital signal.

6. A system according to claim 5, wherein said switching means is a switching matrix.

7. A system according to claim 6, wherein said serial digital signal is a time-division multiplexed signal comprising eight channel time slots.

8. A system according to claim 5, wherein said serial digital signal is a time-division multiplexed signal comprising eight channel time slots.

9. A system according to claim 3, wherein each of said at least one inbound baseband signal and at least one outbound baseband signal is a serial digital signal.

10. A system according to claim 9, wherein said switching means is a switching matrix.

11. A system according to claim 9 or 10, wherein said serial digital signal is a time-division multiplexed signal comprising eight channel time slots.

12. A system according to claim 11, wherein said baseband signal processing means includes a plurality of baseband processing units, each processing unit processing one inbound time-division multiplexed baseband signal and one outbound multiplexed baseband signal, each processing unit being coupled to said radio transceivers by a serial time-division common bus for receiving and transmitting of information therewith and under the control of said switching means.

13. A system according to claim 12, wherein control signals are transmitted, at least from one processing unit to said radio transceiver, via said serial time-division common bus.

14. A system according to claim 1, wherein:
   said at least one output of said baseband signal processing means is switched to said baseband input in a different one of said radio transmitters after each transmission of a channel time slot in accordance with said frequency-hopping sequence.

15. A system according to claim 1, wherein:
   said switching means is a switching matrix, said at least one baseband signal is a time-division multiplexed serial digital signal comprising eight channel time slots, said at least one output of said baseband signal processing means is switched to said input in a different one of said radio transmitters after each transmission of a channel time slot in accordance with said frequency-hopping sequence.

16. A system according to claim 2, wherein:
   said at least one output of said baseband signal processing means is switched to said baseband output in a different one of said radio receivers after each reception of a channel time slot in accordance with said frequency-hopping sequence.

17. A system according to claim 3, wherein:
   said input and output of said baseband signal processing means are switched to said baseband output and baseband input in a different one of said radio transceivers, preferably after each transmission or reception of a channel time slot during guard intervals between channel time slots.

* * * * *